(12) United States Patent
Nishimura

(10) Patent No.: US 12,155,643 B2
(45) Date of Patent: Nov. 26, 2024

(54) INFORMATION PROCESSING SYSTEM, EQUIPMENT, AND SERVER

(71) Applicant: Panasonic Intellectual Property Management Co., Ltd., Osaka (JP)

(72) Inventor: Hideki Nishimura, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 285 days.

(21) Appl. No.: 17/637,320

(22) PCT Filed: Jun. 14, 2021

(86) PCT No.: PCT/JP2021/022548
§ 371 (c)(1),
(2) Date: Feb. 22, 2022

(87) PCT Pub. No.: WO2022/180877
PCT Pub. Date: Sep. 1, 2022

(65) Prior Publication Data
US 2023/0164133 A1 May 25, 2023

(30) Foreign Application Priority Data
Feb. 24, 2021 (JP) .................. 2021-027995

(51) Int. Cl.
*H04L 9/40* (2022.01)
*H04L 67/1097* (2022.01)

(52) U.S. Cl.
CPC ...... *H04L 63/0823* (2013.01); *H04L 63/0876* (2013.01); *H04L 67/1097* (2013.01)

(58) Field of Classification Search
CPC ............. H04L 63/0823; H04L 63/0876; H04L 67/1097; H04L 9/32; G06F 21/44
See application file for complete search history.

(56) References Cited

U.S. PATENT DOCUMENTS

2003/0007640 A1 1/2003 Harada et al.
2003/0177357 A1* 9/2003 Chamberlin ......... G06Q 20/389
713/168

(Continued)

FOREIGN PATENT DOCUMENTS

JP 2003-131950 A 5/2003
JP 2005-318572 A 11/2005

(Continued)

OTHER PUBLICATIONS

Stradley et al., "The Electronic Part Supply Chain and Risks of Counterfeit Parts in Defense Applications", Aug. 2006, IEEE Transactions on Components and Packaging Technologies, vol. 29, No. 3, pp. 703-705 (Year: 2006).*

(Continued)

*Primary Examiner* — Kenneth W Chang
(74) *Attorney, Agent, or Firm* — Rimon P.C.

(57) ABSTRACT

Information processing system includes equipment and server that communicates with equipment. Equipment includes first board that is replaceable and configured to store equipment information unique to equipment, second board that is replaceable and configured to store a digital certificate, and second controller that transmits, to server, equipment information and certificate information that is unique to the digital certificate. Server includes server controller that receives equipment information and certificate information that are transmitted from equipment, and server storage that stores equipment information and certificate information that are received by server controller, in association with each other.

9 Claims, 13 Drawing Sheets

(56) References Cited

U.S. PATENT DOCUMENTS

| | | | |
|---|---|---|---|
| 2005/0091485 A1 | 4/2005 | Imai | |
| 2005/0172118 A1* | 8/2005 | Nasu | G03G 21/04 399/24 |
| 2009/0097061 A1* | 4/2009 | Kaneko | H04N 1/00344 358/1.15 |
| 2010/0077204 A1 | 3/2010 | Kawano | |
| 2010/0095338 A1* | 4/2010 | Lo | H04L 63/0823 725/111 |
| 2010/0115268 A1* | 5/2010 | Kudo | H04L 9/3263 726/4 |
| 2010/0241852 A1* | 9/2010 | Sela | G06F 21/73 380/281 |
| 2019/0386835 A1* | 12/2019 | Tsuchitoi | H04L 61/4511 |

FOREIGN PATENT DOCUMENTS

| | | |
|---|---|---|
| JP | 2005-339258 A | 12/2005 |
| JP | 2010-081266 A | 4/2010 |
| JP | 2011-097635 A | 5/2011 |

OTHER PUBLICATIONS

International Search Report issued on Jul. 27, 2021 in International Application No. PCT/JP2021/022548.

\* cited by examiner

INFORMATION PROCESSING SYSTEM, EQUIPMENT, AND SERVER

CROSS-REFERENCE OF RELATED APPLICATIONS

This application is the U.S. National Phase under 35 U.S.C. § 371 of International Patent Application No. PCT/JP2021/022548, filed on Jun. 14, 2021, which in turn claims the benefit of Japanese Application No. 2021-027995, filed on Feb. 24, 2021, the entire disclosures of which Applications are incorporated by reference herein.

TECHNICAL FIELD

The present disclosure relates to an information processing system, equipment, and a server.

BACKGROUND ART

Information processing apparatuses have conventionally been disclosed (e.g., Patent Literature (PTL) 1), in which when storage means for storing unique identification information has been replaced by another storage means, the same identification information as that stored in the storage means before replacement is calculated based on unique identification information stored in the storage means after replacement, and information processing is performed using the calculated identification information.

CITATION LIST

Patent Literature

[PTL 1]
  Japanese Unexamined Patent Application Publication No. 2005-339258

SUMMARY OF INVENTION

Technical Problem

The information processing apparatus disclosed in PTL 1, however, fails to use information that is unique to a digital certificate and therefore cannot maintain safety with ease.

In view of this, it is an object of the present disclosure to provide an information processing system or the like that is capable of maintaining safety with ease.

Solution to Problem

To achieve the object described above, an information processing system according to one embodiment of the present disclosure includes equipment, and a server that communicates with the equipment. The equipment includes a first storage component that is replaceable and configured to store equipment information that is unique to the equipment, a second storage component that is replaceable and configured to store a digital certificate, and an equipment controller that transmits, to the server, the equipment information and certificate information that is unique to the digital certificate. The server includes a server controller that receives the equipment information and the certificate information that are transmitted from the equipment, and a server storage that stores the equipment information and the certificate information that are received by the server controller, in association with each other.

To achieve the object described above, equipment according to one embodiment of the present disclosure is equipment for communicating with a server. The equipment includes a first storage component that is replaceable and configured to store equipment information that is unique to the equipment, a second storage component that is replaceable and configured to store a digital certificate, and an equipment controller that transmits, to the server, the equipment information and certificate information that is unique to the digital certificate.

To achieve the object described above, a server according to one embodiment of the present disclosure is a server for communicating with equipment. The server includes a server controller that receives equipment information and certificate information, the equipment information being unique to the equipment and having been transmitted from the equipment, and the certificate information being unique to a digital certificate stored in the equipment, and a server storage that stores the equipment information and the certificate information that are received by the server controller, in association with each other. When a combination of the equipment information and the certificate information that are received by the server controller does not match a combination of the equipment information and the certificate information that are stored in the server storage and that include a same equipment information as the equipment information received by the server controller, the server storage clears an association between the equipment information and the certificate information in the combination of the equipment information and the certificate information that are stored in the server storage and that include the same equipment information as the equipment information received by the server controller.

Advantageous Effects of Invention

According to the present disclosure, it is possible to obtain an information processing system or the like that is capable of maintaining safety with ease.

DESCRIPTION OF EMBODIMENTS

Hereinafter, embodiments of the present disclosure will be described. Each embodiment described below shows one preferable specific example of the present disclosure. Thus, numerical values, constituent elements, the layout and connection form of constituent elements, steps, the order of steps, and so on shown in the following embodiments are merely examples, and do not limit the scope of the present disclosure.

Each drawing is a schematic diagram and is not always illustrated in precise dimensions. Substantially the same constituent elements are given the same reference signs throughout the drawings, and detailed descriptions thereof shall be omitted or simplified.

Embodiment 1

Information processing system 10 according to Embodiment 1 will be described.

Figure 1:
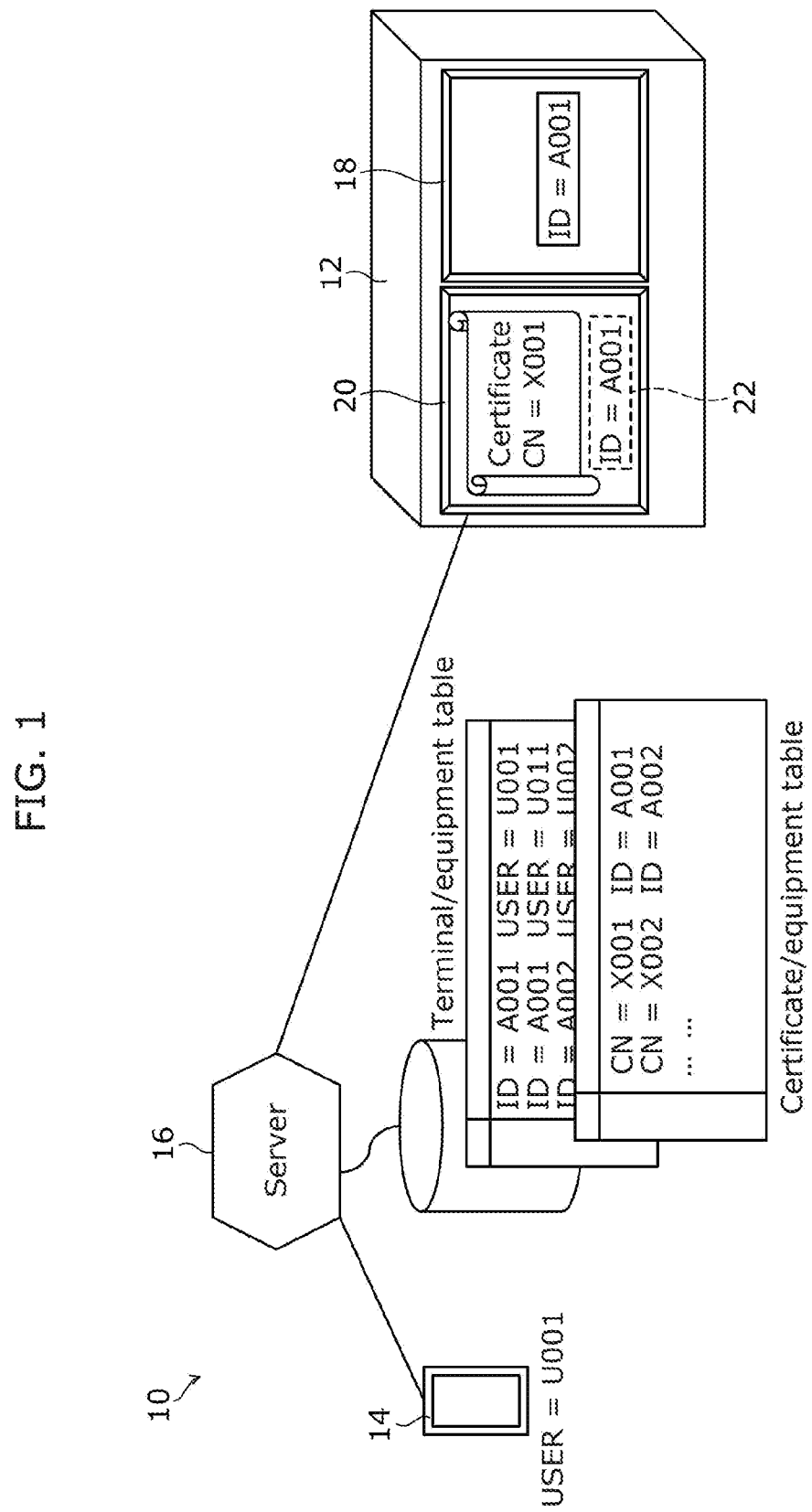
FIG. 1 is a schematic diagram of an information processing system according to Embodiment 1.

FIG. 1 is a schematic diagram of information processing system 10 according to Embodiment 1.

As illustrated in FIG. 1, information processing system 10 includes equipment 12, terminal 14, and server 16.

Equipment 12 communicates with server 16. For example, equipment 12 is facility equipment such as a distribution board, or a home appliance such as a washing machine, a refrigerator, an air conditioner, or a lighting apparatus. Equipment 12 is also Internet of Things (IoT) equipment capable of communication with server 16. Equipment 12 includes first board 18 and second board 20.

First board 18 is one example of a first storage component that is replaceable and configured to store equipment information unique to equipment 12. The equipment information may, for example, be an identifier (ID) of equipment 12. In the present example, the equipment information (ID) indicates A001. First board 18 transmits the equipment information to second board 20.

Second board 20 is one example of a second storage component that is replaceable and configured to store a digital certificate. The digital certificate may, for example, be a certificate that contains a digital signature and that is used in, for example, encryption communication between equipment 12 and server 16. The digital certificate includes certificate information unique to the digital certificate. For example, the certificate information may be information that cannot be tampered with without the key of a certificate authority, and may be a common name (CN). Alternatively, the certificate information may also be any item such as a serial number other than the CN. In the present example, the certificate information (CN) indicates X001. Second board 20 includes storage area 22 configured to store equipment information, acquires equipment information from first board 18, and stores the equipment information. For example, second board 20 receives equipment information transmitted from first board 18 and stores the received equipment information in storage area 22. Second board 20 transmits, to server 16, equipment information and certificate information that are stored in storage area 22.

Terminal 14 communicates with server 16. Terminal 14 may, for example, be a communication terminal such as a smartphone or a tablet. Although the details will be described later, terminal 14 acquires equipment information from equipment 12, accepts an operation of controlling equipment 12 from a user, and transmits, to server 16, the acquired equipment information and user information that is unique to the user. The user information may, for example, be an e-mail address of the user. In the present example, the user information (USER) indicates U001.

Server 16 communicates with equipment 12 and terminal 14. Server 16 receives equipment information and certificate information that are transmitted from equipment 12 and stores the received equipment information and certificate information in association with each other in a certificate/equipment table. Server 16 also receives equipment information and user information that are transmitted from terminal 14 and stores the received equipment information and user information in association with each other in a terminal/equipment table.

Figure 2:
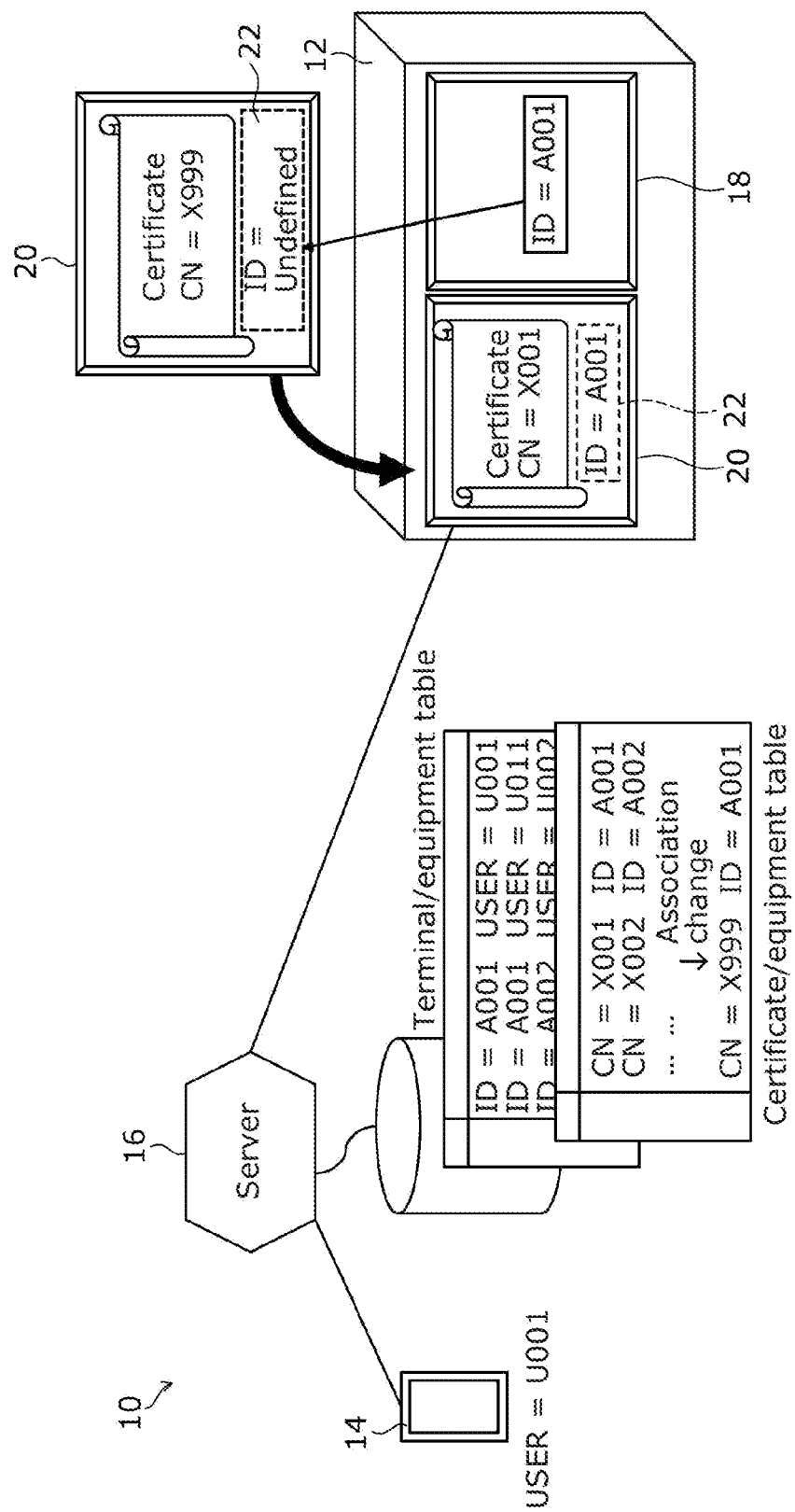
FIG. 2 is a diagram for describing one example of operations performed by the information processing system in FIG. 1 when replacing a second board.

FIG. 2 is a diagram for describing one example of operations performed by information processing system 10 in FIG. 1 when replacing second board 20.

As illustrated in FIG. 2, when second board 20 has been replaced, second board 20 after replacement acquires equipment information from first board 18, stores the equipment information in storage area 22, and transmits, to server 16, equipment information stored in storage area 22 and certificate information that is unique to the digital certificate stored in second board 20 after replacement. In the present example, the certificate information (CN) that is unique to the digital certificate stored in second board 20 before replacement indicates X001, whereas the certificate information (CN) that is unique to the digital certificate stored in second board 20 after replacement indicates X999.

When a combination of the equipment information and the certificate information that are received by server 16 does not match a combination of equipment information and certificate information that are stored in the certificate/equipment table and that include the same equipment information as the equipment information received by server 16, server 16 clears an association between the equipment information and the certificate information in the combination stored in the certificate/equipment table. Then, server 16 stores the combination of the equipment information and the certificate information that are received by server 16 in the certificate/equipment table.

In the present example, the certificate/equipment table contains a combination of A001 and X001, but does not contain a combination of A001 and X999. Thus, when the combination of A001 and X999 has been transmitted from second board 20 after replacement, server 16 determines that the combination of A001 and X999 received by server 16 does not match the combination of A001 and X001 that are stored in the certificate/equipment table and that include A001, and therefore clears the association between A001 and X001 in the combination stored in the certificate/equipment table. Then, server 16 stores the received A001 and X999 in the certificate/equipment table in association with each other. In this way, server 16 modifies associations between the equipment information and the certificate information.

Figure 3:
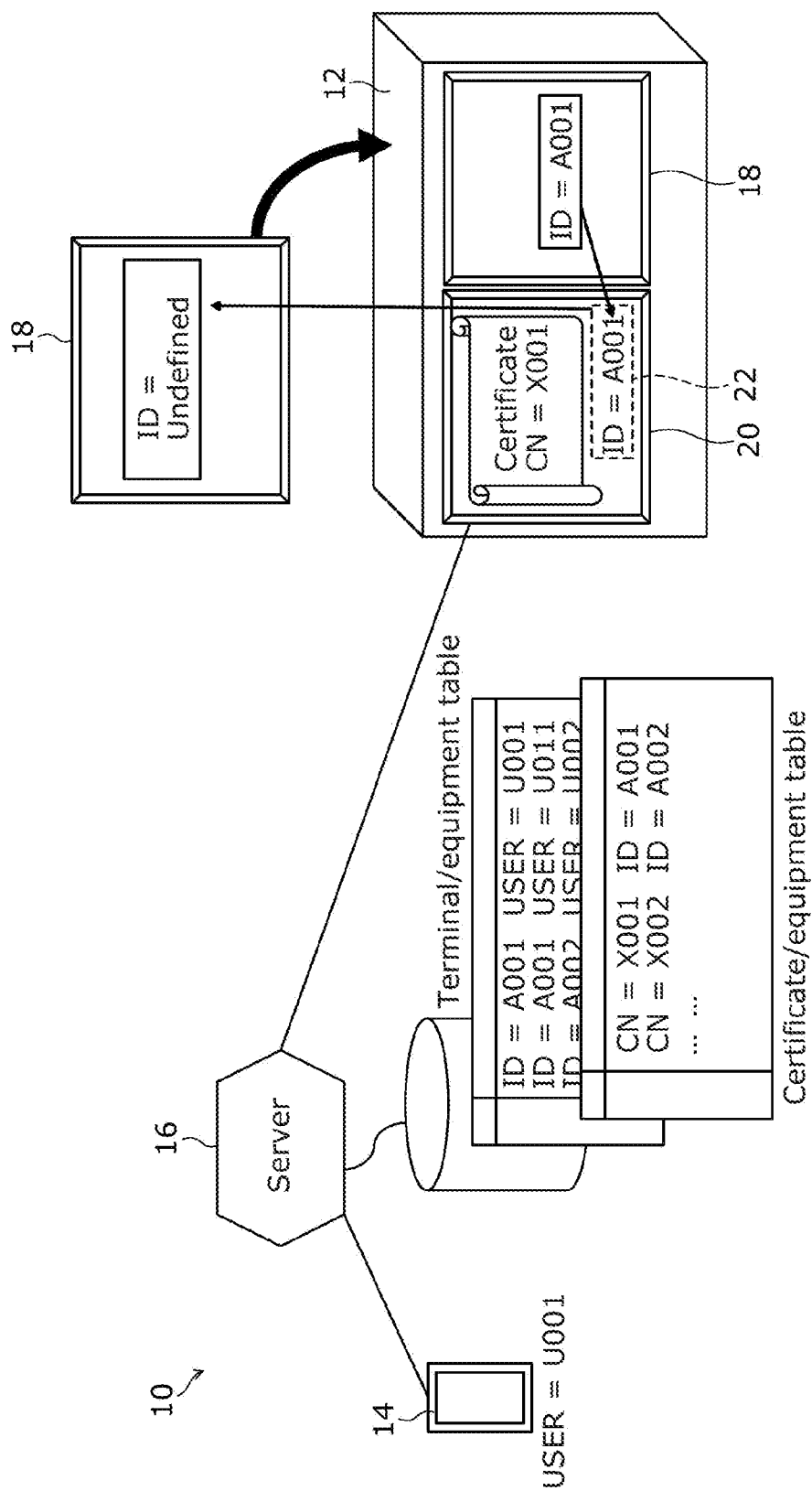
FIG. 3 is a diagram for describing one example of operations performed by the information processing system in FIG. 1 when replacing a first board.

FIG. 3 is a diagram for describing one example of operations performed by information processing system 10 in FIG. 1 when replacing first board 18.

As illustrated in FIG. 3, in the case of replacing first board 18, second board 20 acquires equipment information from first board 18 before replacement, stores the acquired equipment information in storage area 22, and transmits the equipment information and certificate information that are stored in storage area 22 to server 16.

When first board 18 has been replaced, first board 18 after replacement acquires equipment information from second board 20 and stores the acquired equipment information. For example, second board 20 transmits the equipment information stored in storage area 22 to first board 18 after replacement, and first board 18 after replacement receives the equipment information transmitted from second board 20 and stores the received equipment information.

For example, when first board 18 after replacement has equipment information stored therein and the equipment information stored in first board 18 after replacement does not match the equipment information stored in storage area 22, second board 20 acquires, from server 16, equipment information that is stored in the certificate/equipment table in association with the same certificate information as the certificate information that is unique to the digital certificate stored in second board 20, and transmits the acquired equipment information to first board 18 after replacement. First board 18 after replacement receives and stores the equipment information transmitted from second board 20 in replacement of the equipment information stored in first board 18.

Figure 4:
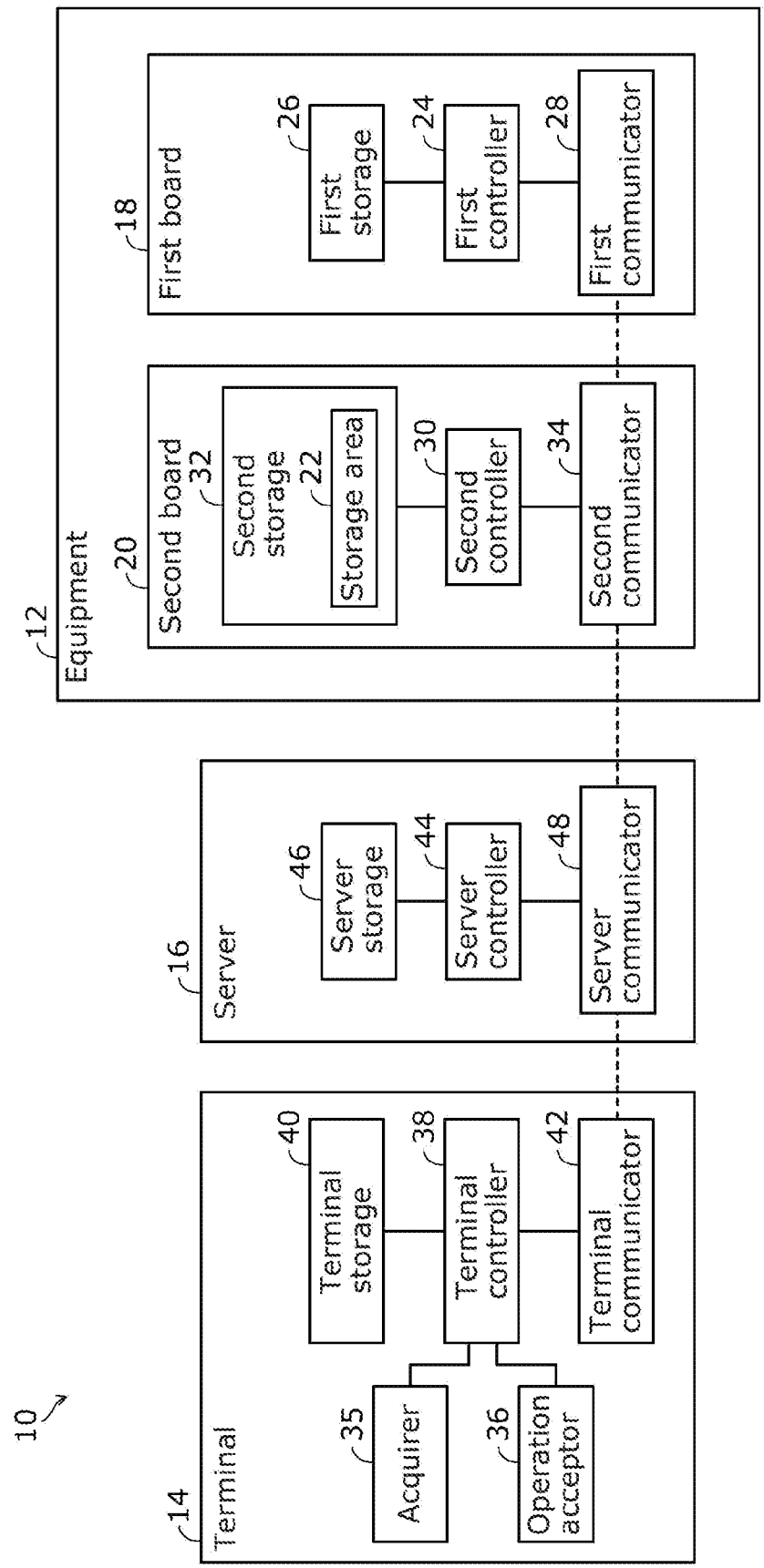
FIG. 4 is a block diagram illustrating a functional configuration of the information processing system in FIG. 1.

FIG. 4 is a block diagram illustrating a functional configuration of information processing system 10 in FIG. 1.

As illustrated in FIG. 4, first board 18 includes first controller 24, first storage 26, and first communicator 28 and serves as, for example, a control board for controlling equipment 12. First controller 24 transmits equipment information stored in first storage 26 to second board 20. First storage 26 is a storage of equipment information. For example, equipment information is stored in first storage 26 by being written to first storage 26 in a factory. First communicator 28 is a communication circuit for establishing communication between first board 18 and second board 20.

Second board 20 includes second controller 30, second storage 32, and second communicator 34 and serves as, for example, a communication module board. Second controller 30 is one example of an equipment controller that transmits equipment information and certificate information to server 16. Alternatively, for example, this equipment controller may be included in first board 18, or may be included in a member other than first board 18 and second board 20. Second storage 32 stores a digital certificate. Also, second storage 32 has storage area 22. Second communicator 34 serves as a communication circuit for establishing communication between second board 20 and each of server 16, terminal 14, and first board 18.

Terminal 14 includes acquirer 35, operation acceptor 36, terminal controller 38, terminal storage 40, and terminal communicator 42. Acquirer 35 serves to acquire equipment information from equipment 12. For example, acquirer 35 may be a camera for reading data such as a QR code (registered trademark) provided on equipment 12 and acquires equipment information by causing acquirer 35 to read the QR code (registered trademark). Operation acceptor 36 accepts an operation of controlling equipment 12 from a user. For example, operation acceptor 36 may be a touch panel or a hardware button. Terminal controller 38 transmits, to server 16, equipment information and user information that are acquired via acquirer 35. Terminal storage 40 stores equipment information and user information. For example, the user information is input by a user and stored in terminal storage 40. Terminal communicator 42 serves as a communication circuit for establishing communication between terminal 14 and each of server 16 and equipment 12.

Server 16 includes server controller 44, server storage 46, and server communicator 48. Server controller 44 receives equipment information and certificate information that are transmitted from equipment 12. Server controller 44 also receives equipment information and user information that are transmitted from terminal 14. Server storage 46 stores equipment information and certificate information that are received by server controller 44 in association with each other. In the present embodiment, server storage 46 stores these equipment information and certificate information in the certificate/equipment table in association with each other. Server storage 46 also stores equipment information and user information that are received by server controller 44 in association with each other. In the present embodiment, server storage 46 stores these equipment information and user information in the terminal/equipment table in association with each other. Server communicator 48 serves as a communication circuit for establishing communication between server 16 and each of equipment 12 and terminal 14.

Figure 5:
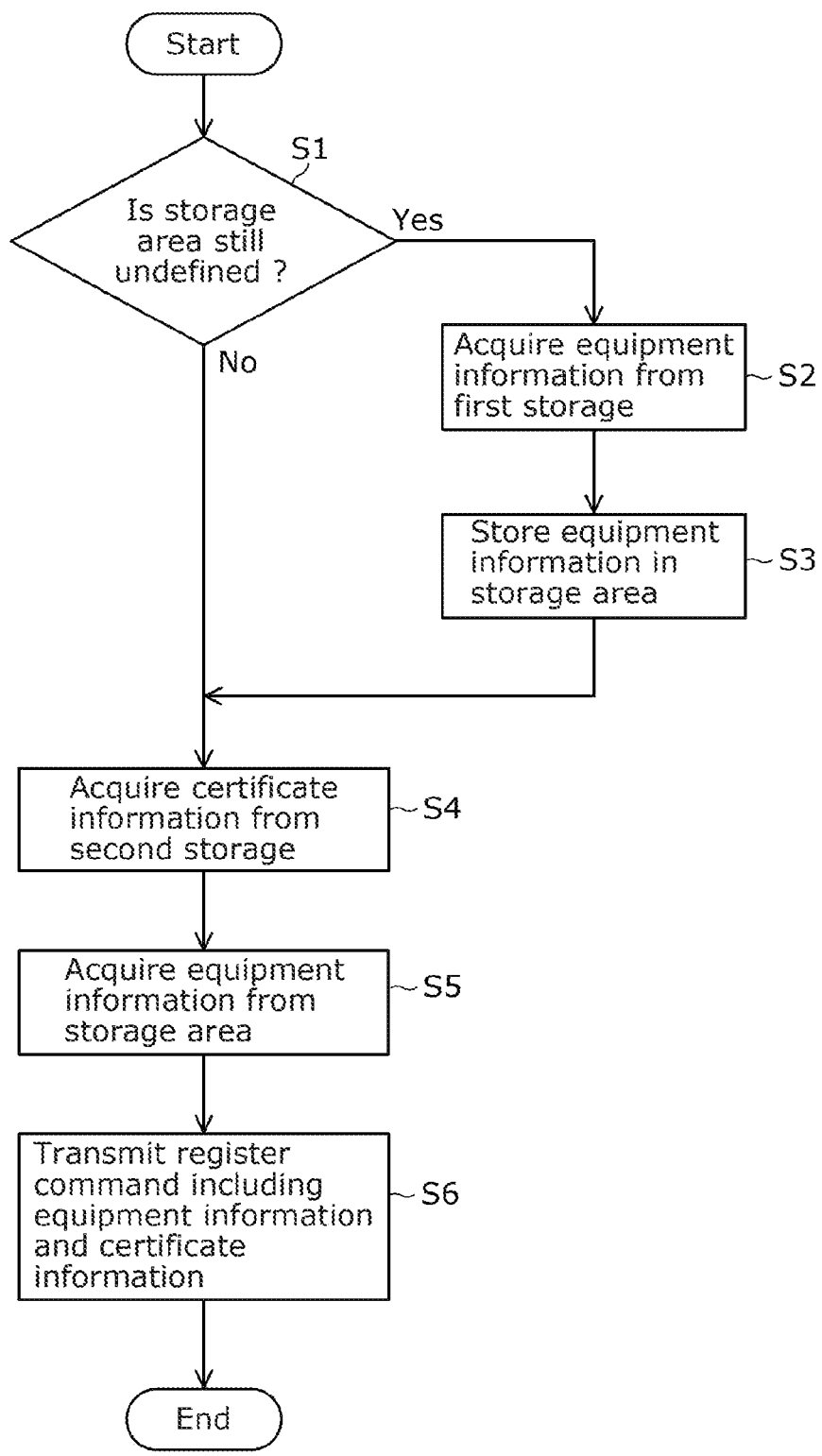
FIG. 5 is a flowchart showing one example of operations performed by a second controller of the information processing system in FIG. 1 when transmitting equipment information and certificate information to a server.

FIG. 5 is a flowchart showing one example of operations performed by second controller 30 in information processing system 10 in FIG. 1 when transmitting equipment information and certificate information to server 16.

For example, when a user tries to control equipment 12 via terminal 14, it is necessary to associate equipment information and user information with each other. In this case, terminal 14 gives, to equipment 12, an instruction to transmit equipment information and certificate information to server 16. For example, upon receipt of this instruction, second controller 30 transmits equipment information and certificate information to server 16 through the following operations.

As illustrated in FIG. 5, second controller 30 determines whether storage area 22 is still undefined (step S1). In other words, second controller 30 determines whether equipment information is stored in storage area 22. If equipment information is stored in storage area 22, second controller 30 determines that storage area 22 has been defined. On the other hand, if no equipment information is stored in storage area 22, second controller 30 determines that the storage area is still undefined.

When having determined that storage area 22 is still undefined (Yes in step S1), second controller 30 acquires equipment information from first storage 26 (step S2). After having acquired the equipment information from first storage 26, second controller 30 stores the acquired equipment information in storage area 22 (step S3).

When having determined that storage area 22 has been defined (No in step S1) or when having stored the equipment information acquired from first storage 26 in storage area 22

(step S3), second controller 30 acquires certificate information from second storage 32 (step S4).

After having acquired the certificate information from second storage 32, second controller 30 acquires equipment information from storage area 22 (step S5).

After having acquired the equipment information from storage area 22, second controller 30 transmits a register command that includes the equipment information and the certificate information to server 16 (step S6).

For example, when second board 20 has been replaced, second controller 30 of second board 20 after replacement performs the aforementioned operations and thereby transmits, to server 16, the equipment information and the certificate information that is unique to the digital certificate stored in second board 20 after replacement.

Figure 6:
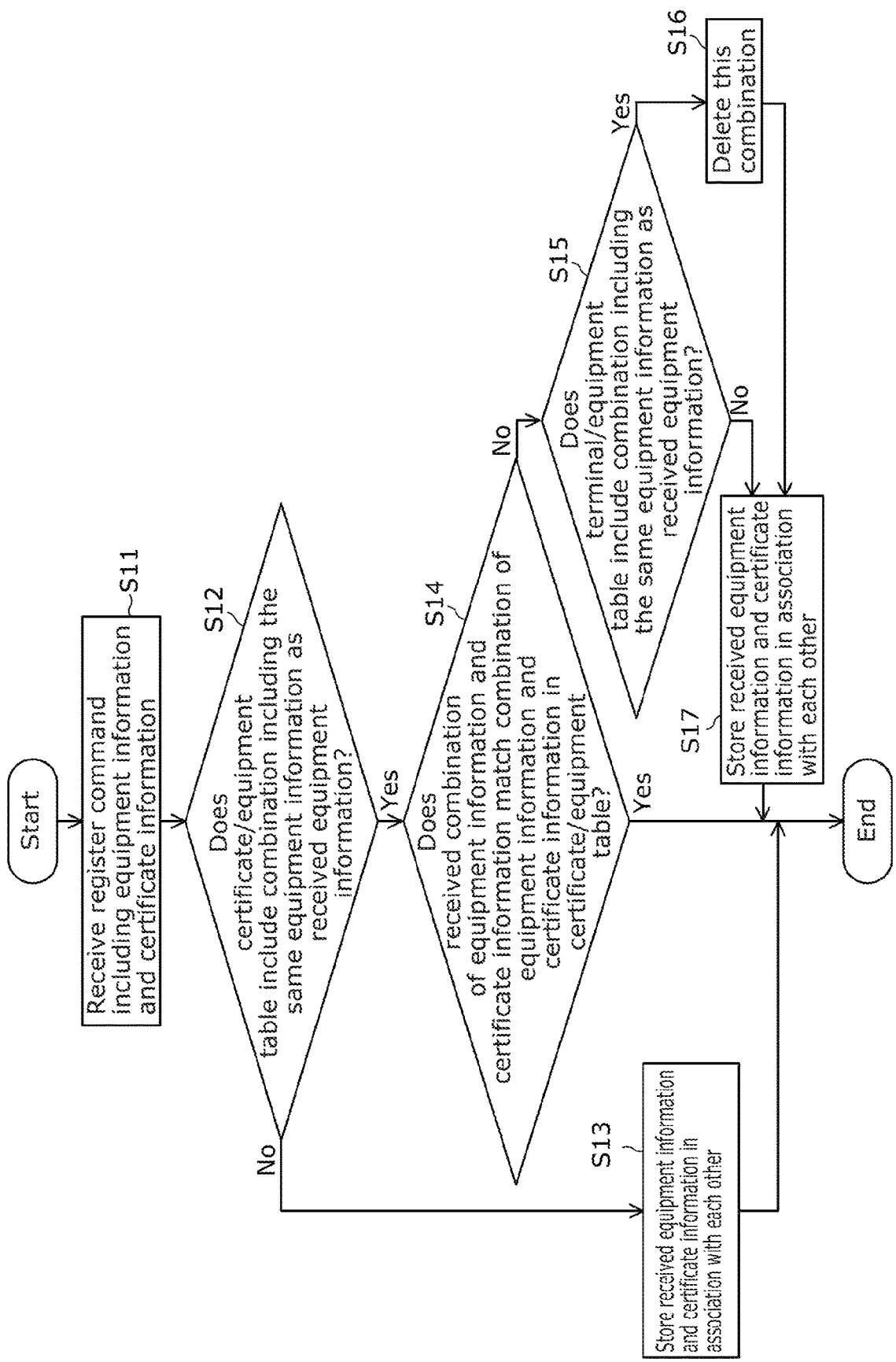
FIG. 6 is a flowchart showing one example of operations performed by a server controller of the information processing system in FIG. 1 after having received equipment information and certificate information.

FIG. 6 is a flowchart showing one example of operations performed by server controller 44 in information processing system 10 in FIG. 1 after having received the equipment information and the certificate information.

As illustrated in FIG. 6, upon receipt of the register command including the equipment information and the certificate information from equipment 12 (step S11), server controller 44 identifies the equipment information and the certificate information that have been received, and determines whether the certificate/equipment table contains a combination that includes the same equipment information as the received equipment information (step S12). That is, server controller 44 determines whether there is a combination of equipment information and certificate information that are stored in server storage 46 and that include the same equipment information as the equipment information received by server controller 44. For example, when server storage 46 contains a combination of A001 and X001 and server controller 44 has received equipment information indicating A001 from equipment 12, server controller 44 determines that there is a combination of equipment information and certificate information that are stored in server storage 46 and that include the same equipment information as the equipment information received by server controller 44.

When the certificate/equipment table contains no combination that includes the same equipment information as the received equipment information (No in step S12), server controller 44 stores the equipment information and the certificate information that have been received, in the certificate/equipment table in association with each other (step S13). That is, server storage 46 stores the equipment information and the certificate information that have been received by server controller 44, in association with each other.

When the certificate/equipment table contains a combination that includes the same equipment information as the received equipment information (Yes in step S12), server controller 44 determines whether the received combination of the equipment information and certificate information matches the combination of the equipment information and the certificate information that are stored in the certificate/equipment table (step S14). That is, server controller 44 determines whether the combination of the equipment information and the certificate information received by server controller 44 matches the combination of the equipment information and the certificate information that are stored in server storage 46 and that include the same equipment information as the equipment information received by server controller 44. For example, when server controller 44 has received a combination of A001 and X999 and server storage 46 contains a combination of A001 and X001, it is determined that there is a mismatch.

When the received combination of the equipment information and the certificate information does not match the combination of the equipment information and the certificate information stored in the certificate/equipment table (No in step S14), server controller 44 determines whether the terminal/equipment table contains any combination that includes the same equipment information as the received equipment information (step S15). That is, server controller 44 determines whether there is a combination of equipment information and user information that are stored in server storage 46 and that include the same equipment information as the equipment information received by server controller 44. For example, when server storage 46 contains A001 and U001 in association with each other and server controller 44 has received equipment information indicating A001 from equipment 12, server controller 44 determines that there is a combination of equipment information and user information that are stored in server storage 46 and that include the same equipment information as the equipment information received by server controller 44.

When the combination of the equipment information and the certificate information received by server controller 44 does not match the combination of the equipment information and the certificate information stored in the certificate/equipment table (No in step S14), i.e., when the combination of the equipment information and the certificate information received by server controller 44 does not match the combination of the equipment information and the certificate information that are stored in server storage 46 and that include the same equipment information as the equipment information received by server controller 44, server storage 46 clears the association between the equipment information and the certificate information in the combination of the equipment information and the certificate information that are stored in server storage 46 and that include the same equipment information as the equipment information received by server controller 44.

When the terminal/equipment table contains a combination that includes the same equipment information as the received equipment information (Yes in step S15), server controller 44 deletes this combination from the terminal/equipment table (step S16). That is, when the combination of the equipment information and the certificate information received by server controller 44 does not match the combination of the equipment information and the certificate information that are stored in server storage 46 and that include the same equipment information as the equipment information received by server controller 44 and there is a combination of equipment information and user information that are stored in server storage 46 and that include the same equipment information as the equipment information received by server controller 44, server storage 46 clears the association between the equipment information and the user information in this combination. If there are a plurality of such combinations, associations between the equipment information and the user information in all of these combinations are cleared.

When the terminal/equipment table does not contain any combination that includes the same equipment information as the received equipment information (No in step S15) or when the terminal/equipment table contains a combination of equipment information and certificate information that include the same equipment information as the received equipment information and this combination is cleared from the terminal/equipment table (step S16), the equipment information and the certificate information that have been received are stored in the certificate/equipment table in association with each other (step S17).

Alternatively, for example, server storage 46 may provide a predetermined notification to the user when the combination of the equipment information and the certificate information received by server controller 44 does not match the combination of equipment information and certificate information that are stored in server storage 46 and that include the same equipment information as the equipment information received by server controller 44, and there is a combination of equipment information and user information that are stored in server storage 46 and that include the same equipment information as the equipment information received by server controller 44. The predetermined notification may, for example, be a notification indicating the occurrence of an error displayed on terminal 14.

In this case, for example, server controller 44 may regard the received combination of the equipment information and the certificate information as being an invalid combination from then on in order to maintain security. At this time, for example, an initialization button may be provided on equipment 12, and a user may press the initialization button to clear the association between the equipment information and the user information in the combination of equipment information and user information that are stored in server storage 46 and that include the same equipment information as the equipment information received by server controller 44.

Figure 7:
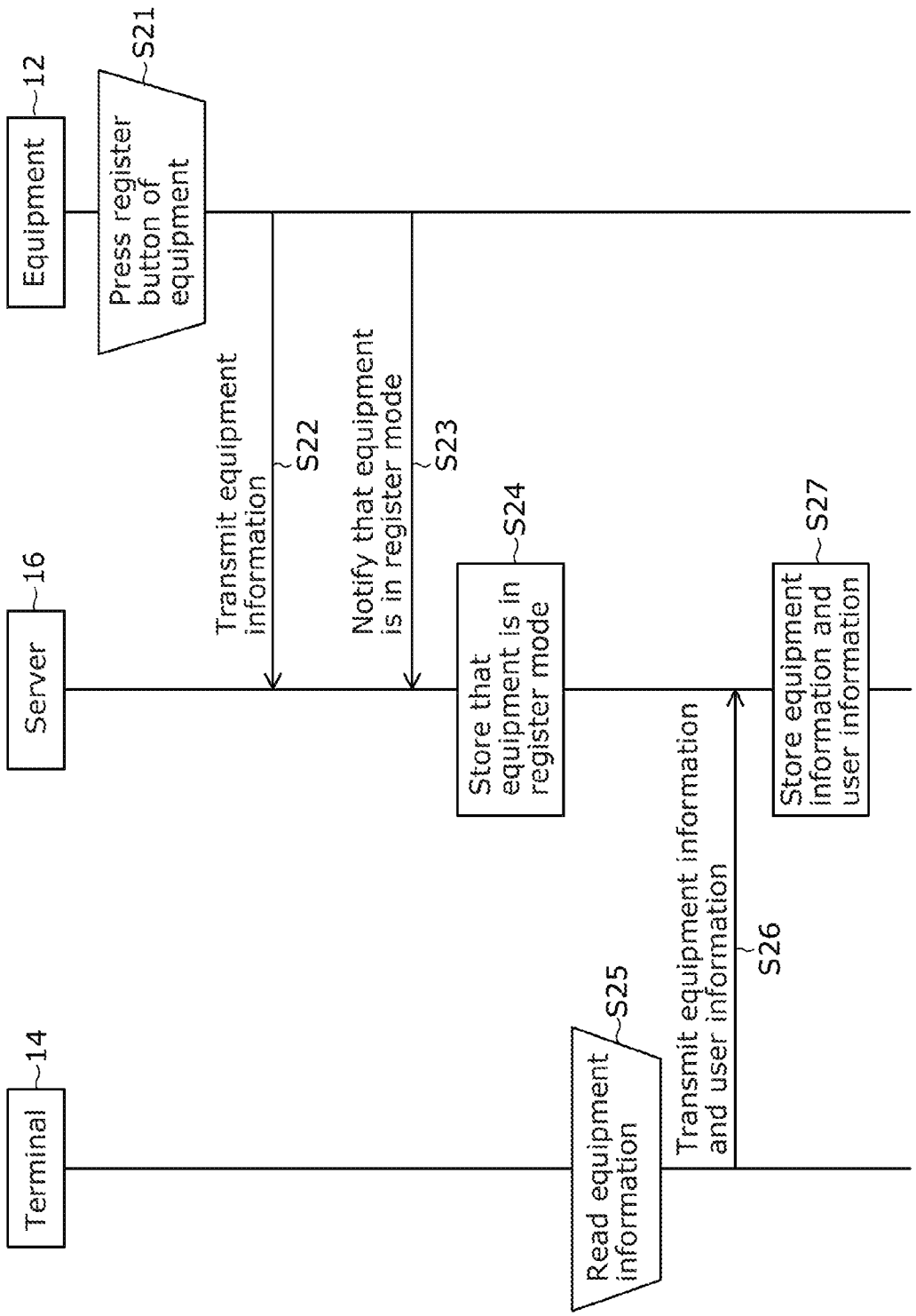
FIG. 7 is a sequence diagram showing one example of operations performed by the information processing system in FIG. 1 when storing equipment information and user information in association with each other.

FIG. 7 is a sequence diagram showing one example of operations performed by information processing system 10 in FIG. 1 when storing equipment information and user information in association with each other.

As illustrated in FIG. 7, when a user has pressed a registration button provided on equipment 12 (step S21), second controller 30 transmits equipment information to server 16 (step S22) and provides a notification indicating that the equipment is in a registration mode of accepting a registration, to server 16 (step S23). For example, when the user has pressed the registration button provided on equipment 12, equipment 12 enters a 10-minute registration mode.

Typically, server controller 44 performs the processing illustrated in FIG. 6 with this timing and stores information indicating that equipment 12 is in the registration mode in the terminal/equipment table, unless the processing ends upon receipt of a predetermined notification (step S24).

When the user has read the equipment information via terminal 14 (step S25), terminal controller 38 transmits the read equipment information and user information to server 16 (step S26). For example, the user inputs user information to terminal 14 and then reads a QR code (registered trademark) printed on equipment 12 by the camera of terminal 14. Terminal controller 38 transmits the read equipment information and the user information inputted by the user to server 16.

Using the equipment information that has been transmitted from equipment 12 and received by server controller 44 and the equipment information and the user information that have been transmitted from terminal 14 and received by server controller 44, server storage 46 stores equipment information and certificate information in the terminal/equipment table in association with each other (step S27). Specifically, server storage 46 determines whether the equipment information transmitted from equipment 12 in the registration mode and received by server controller 44 matches the equipment information transmitted from terminal 14 and received by server controller 44, and if they match, stores the user information and the equipment information that have been transmitted from terminal 14 and received by server controller 44 in association with each other.

Figure 8:
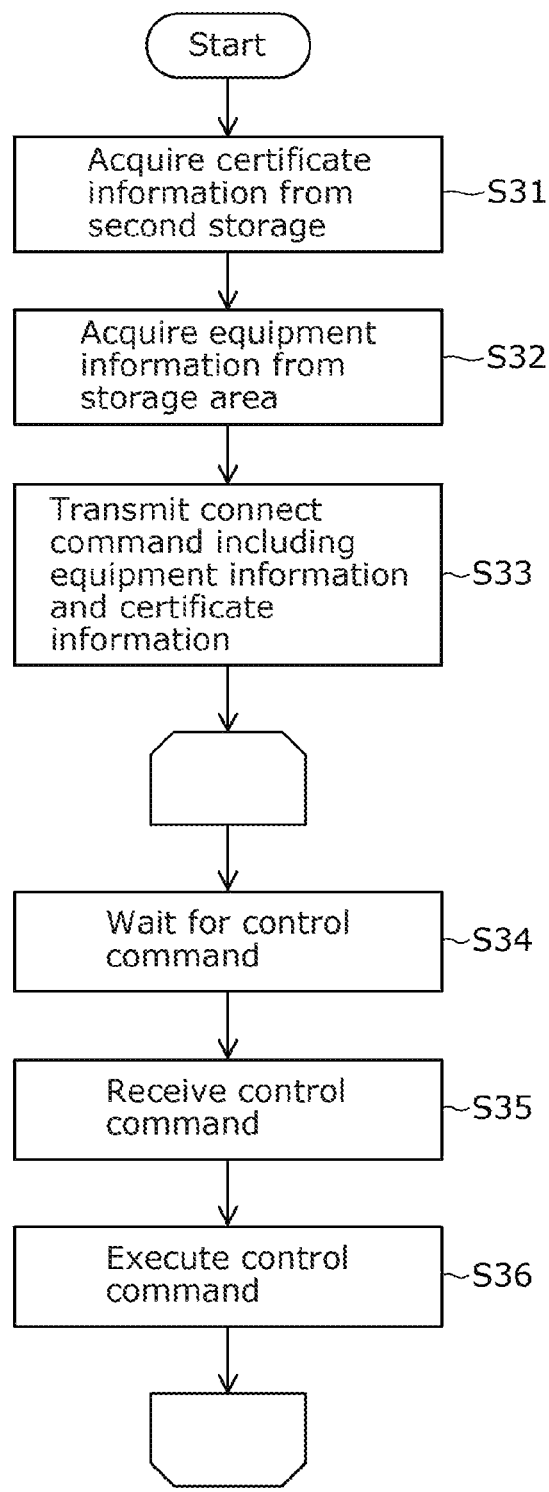
FIG. 8 is a flowchart showing one example of operations performed by an equipment controller of the information processing system in FIG. 1 when having received a control command transmitted from the server.

FIG. 8 is a flowchart showing one example of operations performed by second controller 30 in information processing system 10 in FIG. 1 when having received a control command transmitted from server 16.

As illustrated in FIG. 8, second controller 30 acquires certificate information from second storage 32 (step S31), acquires equipment information from storage area 22 (step S32), and transmits a connect command that includes the equipment information and the certificate information that have been acquired, to server 16 (step S33).

After having transmitted the connect command including the equipment information and the certificate information to server 16, second controller 30 waits for transmission of a control command (step S34). Upon receipt of the control command (step S35), server controller 30 executes the control command (step S36).

Second controller 30 executes the control command upon each receipt of the control command.

Figure 9:
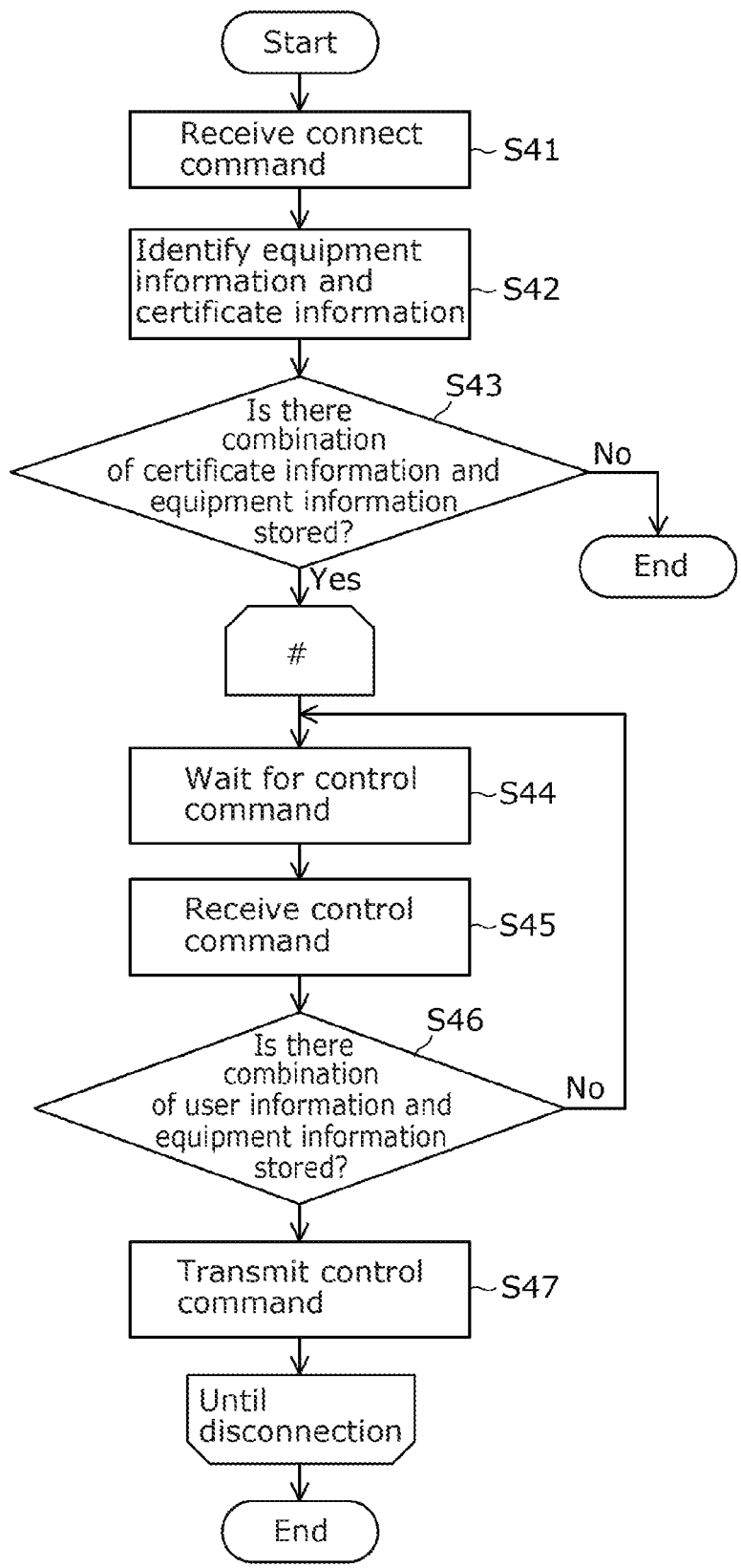
FIG. 9 is a flowchart showing one example of operations performed by the server controller of the information processing system in FIG. 1 when transmitting a control command to equipment.

FIG. 9 is a flowchart showing one example of operations performed by server controller 44 in information processing system 10 in FIG. 1 when transmitting a control command to equipment 12.

As illustrated in FIG. 9, upon receipt of a connect command from equipment 12 (step S41), server controller 44 identifies equipment information and certificate information that are included in the connect command (step S42).

Server controller 44 determines whether the certificate/equipment table contains a combination of the equipment information and the certificate information that have been identified, i.e., the combination of the equipment information and the certificate information that have been received from equipment 12 (step S43).

When the certificate/equipment table does not contain the combination of the equipment information and the certificate information that have been identified (No in step S43), server controller 44 ends the processing.

When the certificate/equipment table contains the combination of the equipment information and the certificate information that have been identified (Yes in step S43), server controller 44 waits for transmission of a control command from terminal 14 to equipment 12 (step S44), and upon receipt of a control command from terminal 14 (step S45), determines whether the terminal/equipment table already contains a combination of equipment information and user information that are included in the control command (step S46). That is, server controller 44 determines whether the user information included in the control command is already registered in equipment 12.

When the terminal/equipment table does not contain the combination of the equipment information and the user information that are included in the control command (No in step S46), server controller 44 again waits for transmission of a control command for equipment 12 from terminal 14 (step S44).

When the terminal/equipment table contains the combination of the equipment information and the user information that are included in the control command (Yes in step S46), server controller 44 transmits a control command to equipment 12 (step S47).

Upon every receipt of a control command for equipment 12 from terminal 14, server controller 44 transmits the control command to equipment 12 until disconnection of equipment 12 and terminal 14 via server 16.

The above has been a description of information processing system 10 according to Embodiment 1.

Information processing system 10 as described above includes equipment 12 and server 16 that communicates with equipment 12. Equipment 12 includes first board 18 that is replaceable and configured to store equipment information unique to equipment 12, second board 20 that is replaceable and configured to store a digital certificate, and second controller 30 that transmits, to server 16, equipment information and certificate information unique to the digital certificate. Server 16 includes server controller 44 that receives equipment information and certificate information that are transmitted from equipment 12, and server storage 46 that stores equipment information and certificate information that are received by server controller 44 in association with each other.

According to this configuration, since equipment 12 includes first board 18 configured to store equipment information and second board 20 that stores a digital certificate, even when second board 20 has been replaced, equipment 12 is capable of communication with server 16 by using the equipment information stored in first board 18 and is also capable of communication with server 16 by using the digital certificate stored in second board 20 after replacement. Accordingly, it is possible to maintain security with ease.

In information processing system 10 as described above, when second board 20 has been replaced, second controller 30 transmits, to server 16, the equipment information and certificate information that is unique to the digital certificate stored in second board 20 after replacement. Then, when a combination of the equipment information and the certificate information that have been received by server controller 44 does not match a combination of equipment information and certificate information that are stored in server storage 46 and that include the same equipment information as the equipment information received by server controller 44, server storage 46 clears the association between the equipment information and the certificate information in the combination of the equipment information and the certificate information that are stored in server storage 46 and that include the same equipment information as the equipment information received by server controller 44.

According to this configuration, the equipment information and the certificate information stored in second board 20 after replacement can be stored in association with each other, and the association between the equipment information and the certificate information stored in second board 20 before replacement can be cleared. Therefore, it is possible to identify equipment 12 from a combination of equipment information and certificate information with ease and to maintain safety with more ease.

In information processing system 10 as described above, second board 20 has storage area 22 configured to store equipment information and acquires equipment information from first board 18 and stores the equipment information in storage area 22.

According to this configuration, since second board 20 is configured to store equipment information, even when first board 18 has been replaced, the equipment information stored in first board 18 before replacement can be stored in advance in second board 20 before replacement and used for communication with server 16. Therefore, even when first board 18 has been replaced, server 16 is capable of identifying equipment 12 without modifying associations between equipment information and certificate information. Accordingly, it is possible to maintain security with more ease.

In information processing system 10 as described above, when first board 18 has been replaced, first board 18 after replacement acquires equipment information from second board 20 and stores the acquired equipment information.

According to this configuration, even when first board 18 has been replaced, the equipment information stored in first board 18 before replacement can be stored in first board 18 after replacement and can be used for communication with server 16. Therefore, even when first board 18 has been replaced, server 16 is capable of identifying equipment 12 without modifying associations between the equipment information and the certificate information. Accordingly, it is possible to maintain security with more ease.

Information processing system 10 as described above further includes terminal 14 that includes acquirer 35 that acquires equipment information from equipment 12, operation acceptor 36 that accepts an operation of controlling equipment 12 from a user, and terminal controller 38 that transmits, to server 16, the equipment information acquired by acquirer 45 and user information unique to a user. Server controller 44 receives equipment information and user information that are transmitted from terminal 14, and server storage 46 stores the equipment information and the user information that are received by server controller 44 in association with each other.

According to this configuration, storing the equipment information and the user information in association with each other allows the server to easily identify a user who controls equipment 12 and reduces the possibility that equipment 12 is controlled by other users. Accordingly, it is possible to maintain security with more ease.

In information processing system 10 as described above, when a combination of equipment information and certificate information received by server controller 44 does not match a combination of equipment information and certificate information that are stored in server storage 46 and that include the same equipment information as the equipment information received by server controller 44, and there is a combination of equipment information and user information that are stored in server storage 46 and that include the same equipment information as the equipment information received by server controller 44, server storage 46 clears the association between the equipment information and the user information in the combination of the equipment information and the user information that are stored in server storage 46 and that include the same equipment information as the equipment information received by server controller 44.

According to this configuration, it is possible to reduce the possibility that equipment 12 may be controlled by other users using the equipment information about equipment 12 and different certificate information. Accordingly, it is possible to maintain security with more ease.

In information processing system 10 as described above, when a combination of equipment information and certificate information received by server controller 44 does not match a combination of equipment information and certificate information that are stored in server storage 46 and that include the same equipment information as the equipment information received by server controller 44, and there is a combination of equipment information and user information that are stored in server storage 46 and that include the same equipment information as the equipment information received by server controller 44, server controller 44 provides a predetermined notification.

According to this configuration, when other users try to control equipment 12 by using the equipment information about equipment 12 and different certificate information, a predetermined notification is provided to avoid the received combination of equipment information and certificate information from being regarded as being valid. Accordingly, it is possible to maintain security with more ease.

Embodiment 2

Information processing system 10a according to Embodiment 2 will be described. The following description mainly focuses on differences from information processing system 10 according to Embodiment 1.

Figure 10:
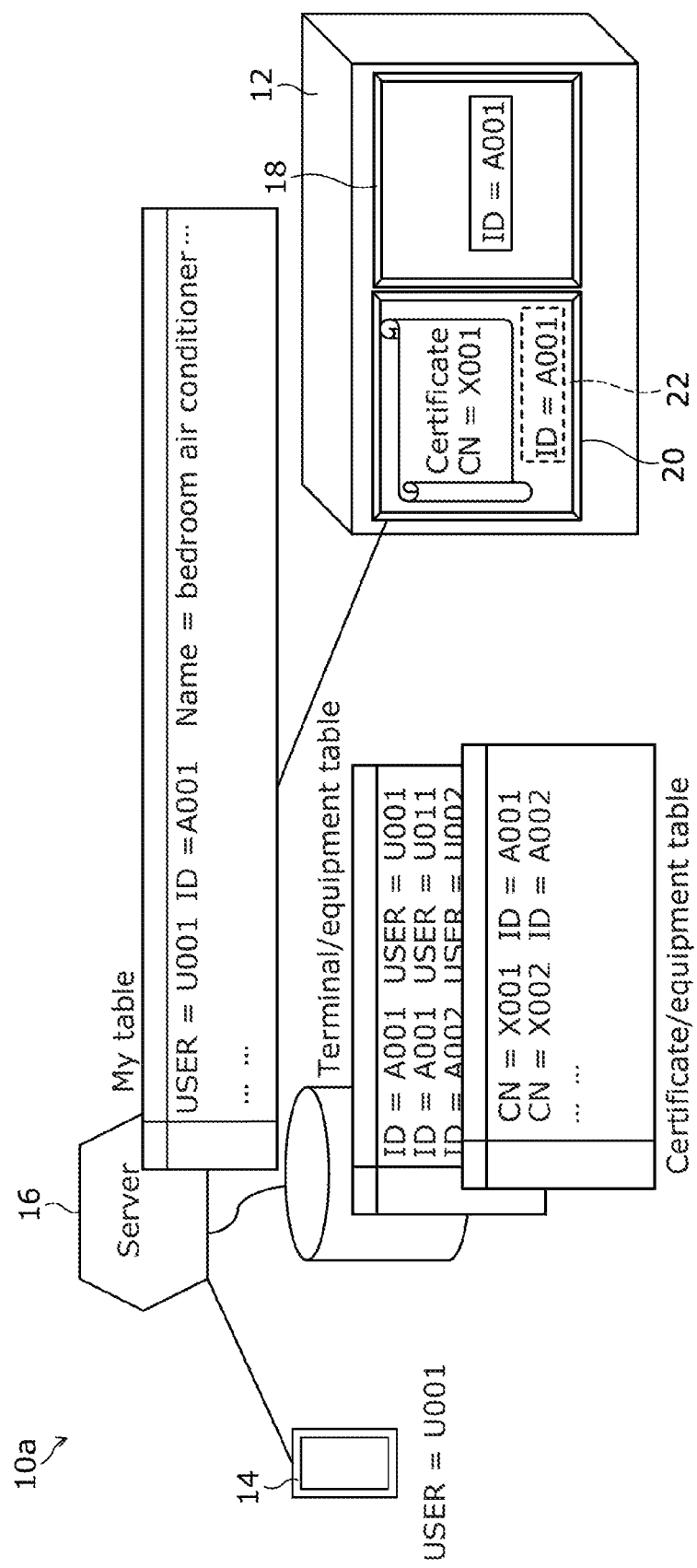
FIG. 10 is a schematic diagram of an information processing system according to Embodiment 2.

FIG. 10 is a schematic diagram illustrating information processing system 10a according to Embodiment 2.

As illustrated in FIG. 10, information processing system 10a is mainly different from information processing system 10 in that equipment information, user information, and equipment-related information about equipment 12 are stored in My Table in association with one another. Examples of the equipment-related information include the name (nickname) of equipment 12, the purchasing date, the purchasing store, and notes, which are inputted by a user.

Terminal 14 further includes display 50 that displays an input screen for a user to input equipment-related information about equipment 12. A user inputs equipment-related information via terminal 14. Terminal controller 38 transmits equipment-related information inputted by a user to server 16. For example, terminal controller 38 transmits equipment-related information inputted by a user, together with equipment information and user information, to server 16. Server controller 44 receives equipment-related information transmitted from terminal 14. For example, server controller 44 receives equipment information, user information, and equipment-related information that are transmitted from terminal 14. Server storage 46 stores equipment-related information received by server controller 44 in association with equipment information and user information.

Figure 11:
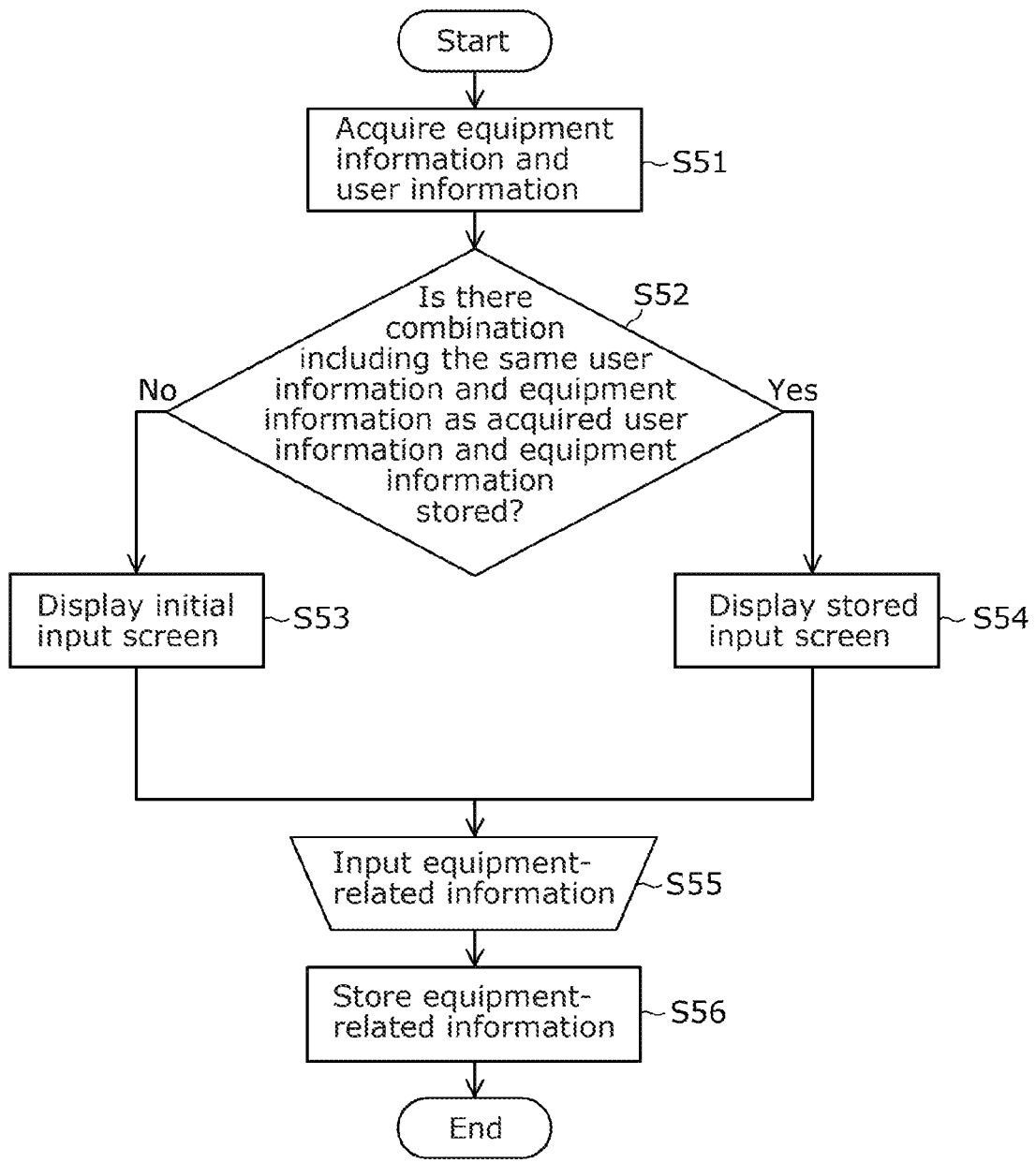
FIG. 11 is a flowchart showing one example of operations performed by the information processing system in FIG. 10 when displaying an input screen for inputting equipment-related information.
Figure 12:
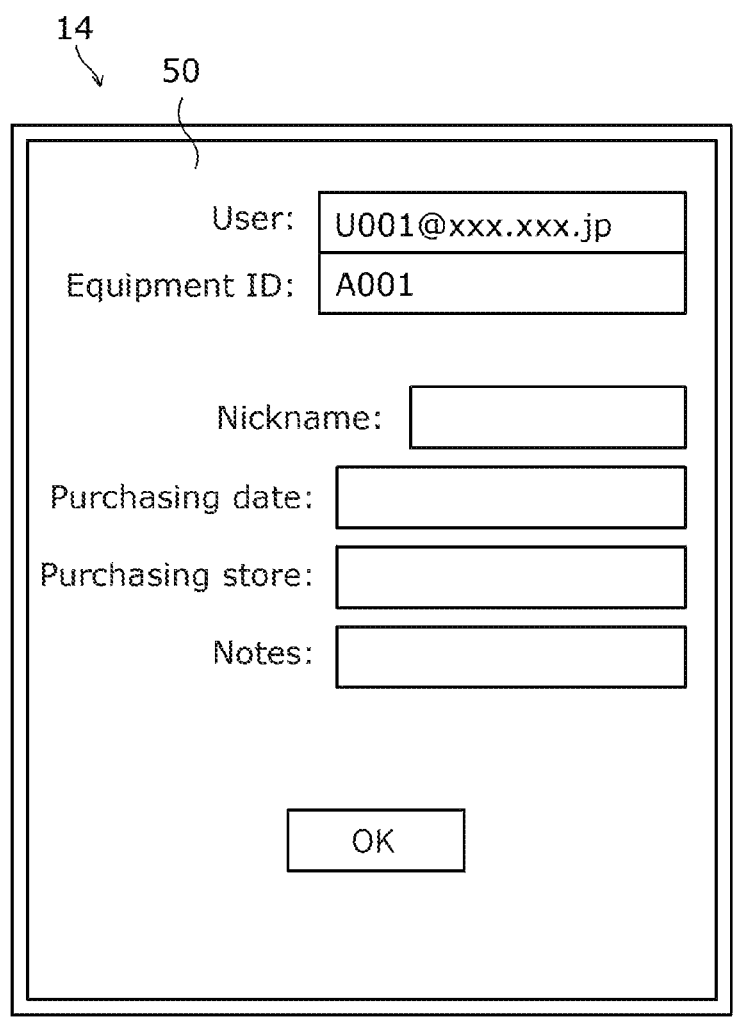
FIG. 12 is a diagram showing one example of the input screen for inputting the equipment-related information, displayed on a terminal of the information processing system in FIG. 10.
Figure 13:
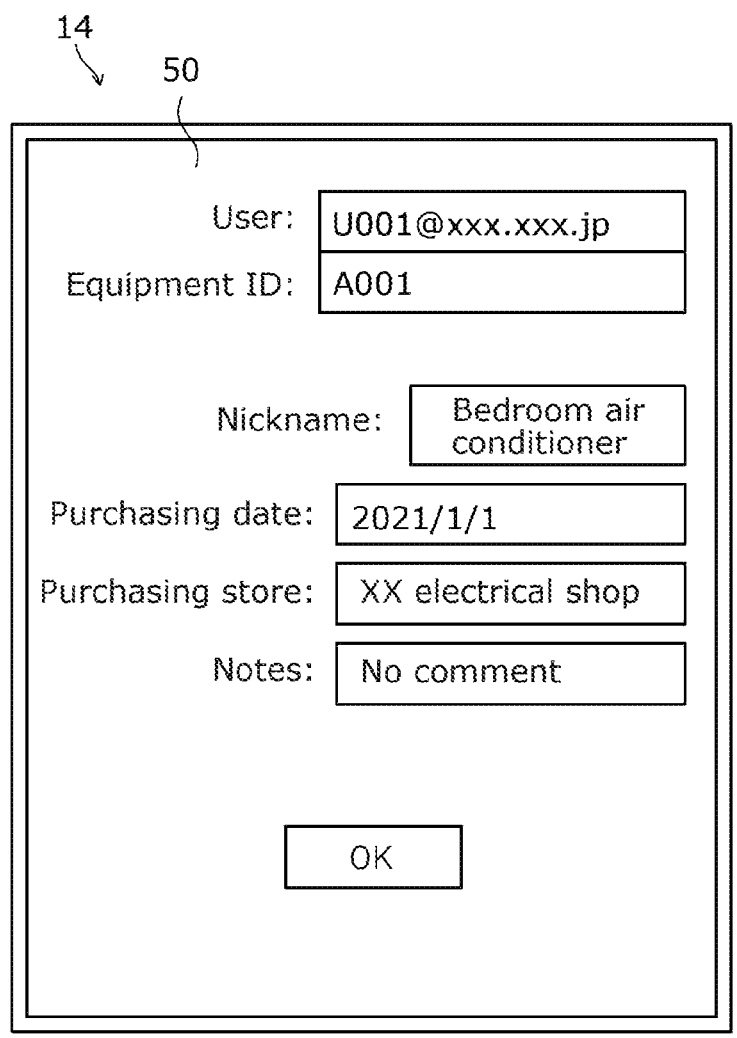
FIG. 13 is a diagram showing another example of the input screen for inputting the equipment-related information, displayed on the terminal of the information processing system in FIG. 10.

FIG. 11 is a flowchart showing one example of operations performed by information processing system 10a in FIG. 10 when displaying an input screen for inputting equipment-related information. FIG. 12 is a diagram showing one example of the input screen for inputting equipment-related information, displayed on terminal 14 of information processing system 10a in FIG. 10. FIG. 13 is a diagram showing another example of the input screen for inputting equipment-related information, displayed on terminal 14 of information processing system 10a in FIG. 10.

As illustrated in FIG. 11, server controller 44 acquires equipment information and user information (step S51). For example, when a user inputs equipment-related information via terminal 14, terminal controller 38 transmits equipment information that is read by acquirer 35 and user information that is inputted by the user to server 16, and server controller 44 receives the equipment information and the user information that are transmitted from terminal 14.

When having acquired the equipment information and the user information, server controller 44 determines whether My Table contains a combination that includes equipment information and user information that are the same as the equipment information and the user information that have been acquired (step S52). That is, server controller 44 determines whether there is equipment-related information that is stored in association with equipment information and user information that are the same as the equipment information and the user information that have been acquired. For example, when server storage 46 contains A001, U001, and bedroom air conditioner (the name of equipment 12) in association with one another and server controller 44 has acquired A001 and U001, server controller 44 determines that there is equipment-related information that is stored in association with equipment information and user information that are the same as the equipment information and the user information that have been acquired.

When server controller 44 has determined that My Table does not contain any combination that includes equipment information and user information that are the same as the equipment information and the user information that have been acquired (No in step S52), display 50 displays an initial input screen (step S53). That is, when there is no equipment-related information that is stored in association with the equipment information and the user information, display 50 displays the initial input screen. For example, display 50 displays an input screen on which information such as the nickname of equipment 12 has not been inputted yet, as illustrated in FIG. 12.

When server controller 44 has determined that My Table contains a combination that includes equipment information and user information that are the same as the equipment information and the user information that have been acquired (Yes in step S52), display 50 displays an input screen on which the equipment-related information stored in My Table has already been inputted (step S54). That is, when there is equipment-related information that is stored in association with the equipment information and the user information, display 50 displays the input screen on which the stored equipment-related information has already been inputted. For example, display 50 displays the input screen on which information such as the nickname of equipment 12 has already been inputted by the user, as illustrated in FIG. 13

Alternatively, assuming that the equipment-related information has already been registered, display 50 may, for example, skip the display of the equipment-related information stored in My Table so as to omit the input of equipment-related information that is not stored in My Table. That is, for example, when there is equipment-related information that is stored in association with the equipment information and the user information, display 50 may skip the display of the input screen. In other words, for example, display 50 does not necessarily have to display the input screen when there is equipment-related information that is stored in association with the equipment information and the user information.

When a user has inputted the equipment-related information via the displayed input screen (step S55), terminal controller 38 transmits the inputted equipment-related information to server 16, together with the equipment information and the user information, and server storage 46 stores the equipment information, the user information, and the equipment-related information that are transmitted from terminal 14 in My Table in association with one another (step S56).

The above has been a description of information processing system 10a according to Embodiment 2.

In information processing system 10a as described above, terminal 14 further includes display 50 that displays an input screen for a user to input equipment-related information about equipment 12. Terminal controller 38 transmits equipment-related information inputted by a user to server 16, server controller 44 receives the equipment-related information transmitted from terminal 14, and server storage 46 stores the equipment-related information received by server controller 44 in association with equipment information and user information. When there is no equipment-related information that is stored in association with the equipment information and the user information, display 50 displays the initial input screen. When there is equipment-related information that is stored in association with the equipment information and the user information, display 50 displays an input screen on which the stored equipment-related information has already been input, or skips the display of the input screen.

According to this configuration, since display 50 displays the initial input screen when there is no equipment-related information stored in association with the equipment information and the user information, the user is able to input equipment-related information with ease. Display 50 also displays the input screen on which the stored equipment-related information has already been input, when there is equipment-related information that is stored in association with the equipment information and the user information. This eliminates the need for the user to again input the equipment-related information that the user has inputted once, and enables the user to input the equipment-related information with high degrees of efficiency. Besides, when there is equipment-related information that is stored in association with the equipment information and the user information, display 50 may skip the display of the input screen. This improves the efficiency of processing without the need for the display to display the input screen over and over again.

While the information processing system and the like according to the present disclosure have been described thus far, the present disclosure is not intended to be limited to these embodiments.

The above embodiments have described the cases in which, when the combination of equipment information and certificate information received by server storage 46 does not match a combination of equipment information and certificate information that are stored in server storage 46 and that include the same equipment information as the equipment information received by server controller 44, server storage 46 clears the association between the equipment information and the certificate information in the combination stored in server storage 46, but the present disclosure is not limited to this example. For example, the server storage does not necessarily have to clear the association between the equipment information and the certificate information in the combination stored in the server storage.

The above embodiments have described the cases in which second board 20 has storage area 22, but the present disclosure is not limited thereto. For example, the second storage component does not necessarily have to include a storage area. In this case, for example, equipment information that is stored in association with certificate information that is the same as the certificate information unique to the digital certificate stored in the second storage component may be transmitted from the server to the equipment, and the equipment information received from the server may be stored in the first storage component after replacement. That is, the first storage component after replacement may acquire and store equipment information transmitted from the server.

The above embodiments have described the cases in which, when the combination of equipment information and certificate information received by server controller 44 does not match the combination of equipment information and certificate information that are stored in server storage 46 and that include the same equipment information as the equipment information received by server controller 44, and there is a combination of equipment information and user information that are stored in server storage 46 and that include the same equipment information as the equipment information received by server controller 44, the association between the equipment information and the user information in this combination is cleared, but the present disclosure is not limited to this example. For example, the server storage does not necessarily have to clear the association between the equipment information and the user information in this combination.

The above embodiments have described the cases in which, when the combination of equipment information and certificate information received by server controller 44 does not match the combination of equipment information and certificate information that are stored in server storage 46 and that include the same equipment information as the equipment information received by server controller 44, and there is a combination of equipment information and user information that are stored in server storage 46 and that include the same equipment information as the equipment information received by server controller 44, server controller 44 provides a predetermined notification, but the present disclosure is not limited to this example. For example, the server controller does not necessarily have to provide a predetermined notification.

The present disclosure is not only implemented as an information processing system or the like according to the above-described embodiments, but also implemented as a program that achieves functions of the equipment, the terminal, and/or the server included in the information processing system. The present disclosure may also be implemented as a computer-readable recording medium having the program recorded thereon, such as a DVD.

In the above-described embodiments, each constituent element may be implemented by executing a software program suitable for the constituent element. Each constituent element may also be implemented by a program executor such as a CPU or a processor reading out and executing a software program recorded on a hard disk or a recording medium such as a semiconductor memory.

Each constituent element may also be impalement by hardware. For example, each constituent element may be a circuit (or an integrated circuit). These circuits may configure a single circuit as a whole, or may configure separate circuits. Each of these circuits may be a general-purpose circuit or may be a dedicated circuit.

Other embodiments are also included in the present disclosure, such as those obtained by applying various changes conceivable by a person skilled in the art to the above-described embodiments and those achieved by arbitrarily combining constituent elements and functions of each embodiment without departing from the scope of the present disclosure.

Industrial Applicability

The present disclosure is useful in an information processing system or the like that is capable of maintaining security with ease.

The invention claimed is:

1. An information processing system comprising:
equipment; and
a server that communicates with the equipment, wherein:
the equipment includes:
a first storage component that is replaceable and configured to store equipment information that is unique to the equipment;

a second storage component that is replaceable and configured to store a digital certificate; and an equipment controller that transmits, to the server, the equipment information and certificate information that is unique to the digital certificate, the server includes:

a server controller that receives the equipment information and the certificate information that are transmitted from the equipment; and a server storage that stores the equipment information and the certificate information that are received by the server controller, in association with each other, when the second storage component has been replaced, the equipment controller transmits, to the server, the equipment information and the certificate information that is unique to the digital certificate stored in the second storage component after replacement, and when a combination of the equipment information and the certificate information that have been received by the server controller does not match a combination of the equipment information and the certificate information that are stored in the server storage and that include a same equipment information as the equipment information received by the server controller, the server storage clears an association between the equipment information and the certificate information in the combination of the equipment information and the certificate information that are stored in the server storage and that include the same equipment information as the equipment information received by the server controller.

2. The information processing system according to claim 1, wherein the second storage component includes a storage area configured to store the equipment information and acquires the equipment information from the first storage component and stores the equipment information in the storage area.

3. The information processing system according to claim 2, wherein, when the first storage component has been replaced, the first storage component after replacement acquires the equipment information from the second storage component and stores the equipment information.

4. The information processing system according to claim 1, further comprising:

a terminal that includes an acquirer, an operation acceptor, and a terminal controller, the acquirer acquiring the equipment information from the equipment, the operation acceptor accepting an operation of controlling the equipment from a user, and the terminal controller transmitting, to the server, the equipment information acquired via the acquirer and user information that is unique to the user, wherein the server controller receives the equipment information and the user information that are transmitted from the terminal, and the server storage stores the equipment information and the user information that are received by the server controller, in association with each other.

5. The information processing system according to claim 4, wherein, when the combination of the equipment information and the certificate information that are received by the server controller does not match the combination of the equipment information and the certificate information that are stored in the server storage and that include the same equipment information as the equipment information received by the server controller, and there is a combination of the equipment information and the user information that are stored in the server storage and that include the same equipment information as the equipment information received by the server controller, the server storage clears an association between the equipment information and the user information in the combination of the equipment information and the user information that are stored in the server storage and that include the same equipment information as the equipment information received by the server controller.

6. The information processing system according to claim 4, wherein, when the combination of the equipment information and the certificate information that are received by the server controller does not match the combination of the equipment information and the certificate information that are stored in the server storage and that include the same equipment information as the equipment information received by the server controller, and there is a combination of the equipment information and the user information that are stored in the server storage and that include the same equipment information as the equipment information received by the server controller, the server controller provides a predetermined notification.

7. The information processing system according to claim 4, wherein the terminal further includes a display that displays an input screen for the user to input equipment-related information relevant to the equipment, the terminal controller transmits the equipment-related information inputted by the user to the server, the server controller receives the equipment-related information transmitted from the terminal, the server storage stores the equipment-related information received by the server controller in association with the equipment information and the user information, when there is no equipment-related information stored in association with the equipment information and the user information, the display displays the input screen that is in an initial state, and when there is the equipment-related information stored in association with the equipment information and the user information, the display either skips display of the input screen or displays the input screen that already has received input of the equipment-related information that is stored.

8. Equipment for communicating with a server, comprising:

a first storage component that is replaceable and configured to store equipment information that is unique to the equipment;

a second storage component that is replaceable and configured to store a digital certificate; and an equipment controller that transmits, to the server, the equipment information and certificate information that is unique to the digital certificate, wherein, when the second storage component has been replaced, the equipment controller transmits, to the server, the equipment information and the certificate information that is unique to the digital certificate stored in the second storage component after replacement.

9. A server for communicating with equipment, comprising:
- a server controller that receives equipment information and certificate information, the equipment information being unique to the equipment and having been transmitted from the equipment, and the certificate information being unique to a digital certificate stored in the equipment; and
- a server storage that stores the equipment information and the certificate information that are received by the server controller, in association with each other, wherein:

when a combination of the equipment information and the certificate information that are received by the server controller does not match a combination of the equipment information and the certificate information that are stored in the server storage and that include a same equipment information as the equipment information received by the server controller, the server storage clears an association between the equipment information and the certificate information in the combination of the equipment information and the certificate information that are stored in the server storage and that include the same equipment information as the equipment information received by the server controller, and when the combination of the equipment information and the certificate information that are received by the server controller does not match the combination of the equipment information and the certificate information that are stored in the server storage and that include the same equipment information as the equipment information received by the server controller, and there is a combination of the equipment information and user information that is unique to a user that are stored in the server storage and that include the same equipment information as the equipment information received by the server controller, the server storage clears an association between the equipment information and the user information in the combination of the equipment information and the user information that are stored in the server storage and that include the same equipment information as the equipment information received by the server controller.

* * * * *